(12) United States Patent
Irle et al.

(10) Patent No.: US 6,236,199 B1
(45) Date of Patent: May 22, 2001

(54) INDUCTIVE ANGLE SENSOR

(75) Inventors: Henning Irle, Lippstadt; Norbert Kost, Geseke; Franz-Josef Schmidt, Salzkotten, all of (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 09/148,705

(22) Filed: Sep. 4, 1998

(30) Foreign Application Priority Data

Sep. 5, 1997 (DE) ............................................. 197 38 836

(51) Int. Cl.$^7$ ....................................................... G01B 7/30
(52) U.S. Cl. ................................ 324/207.17; 324/207.25; 340/870.32
(58) Field of Search ......................... 324/207.17, 207.15, 324/207.16, 207.18, 207.22, 207.23, 207.25; 310/111, 112, 114, 268; 340/870.04, 870.06, 870.31, 870.32; 336/45

(56) References Cited

U.S. PATENT DOCUMENTS

| Re. 32,857 | 2/1989 | Luneau | 322/61 |
|---|---|---|---|
| 4,816,759 | 3/1989 | Ames et al. | 324/207 |
| 5,077,635 | * 12/1991 | Bollhagen et al. | 361/287 |
| 5,406,155 | * 4/1995 | Persson | 310/68 B |
| 5,594,434 | * 1/1997 | McCullough | 341/13 |
| 5,903,205 | * 5/1999 | Goto et al. | 336/130 |
| 6,011,389 | * 1/2000 | Masreliez et al. | 324/207.17 |

FOREIGN PATENT DOCUMENTS

| OS 21 48 703 | 4/1973 | (DE). |
|---|---|---|
| OS 2 158 713 | 6/1973 | (DE). |
| 33 28 421 A1 | 2/1984 | (DE). |
| 36 42 607 A1 | 6/1988 | (DE). |
| 36 42 678 A1 | 6/1988 | (DE). |
| 39 19 749 C2 | 1/1991 | (DE). |
| 43 35 701 C2 | 4/1995 | (DE). |
| 195 04 307 A1 | 8/1996 | (DE). |
| 0 159 191 | 10/1985 | (EP). |

* cited by examiner

Primary Examiner—Christine K. Oda
Assistant Examiner—Henry S. Andersen
(74) Attorney, Agent, or Firm—Birch, Stewart, Kolasch & Birch, LLP

(57) ABSTRACT

An inductive angle sensor includes: a stator element having an exciting coil with a periodic AC voltage applied thereto and several receiving coils; a rotor element that affects a strength of inductive coupling between the exciting coil and receiving coils as a function of its angular position relative to the stator element; and an evaluation circuit for determining an angular position of the rotor element relative to the stator element from voltage signals induced in the receiving coils. The rotor element forms at least one closed-loop lead that, at least over a partial area, forms a periodic repeating bend structure in a direction of a circumference of the rotor element. The inductive angle sensor provides a compact structure, a high resolution, and a particularly high degree of insensitivity to production and installation tolerances.

17 Claims, 4 Drawing Sheets

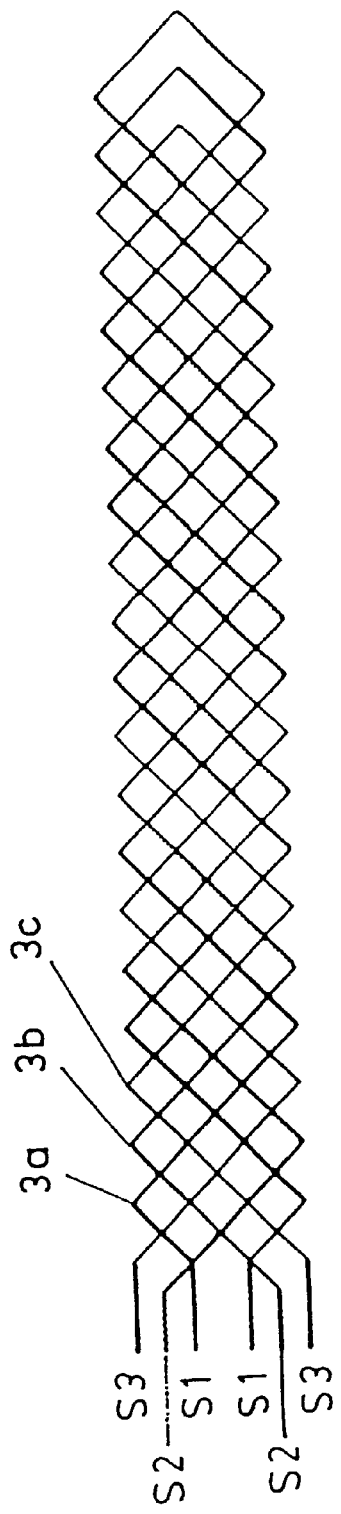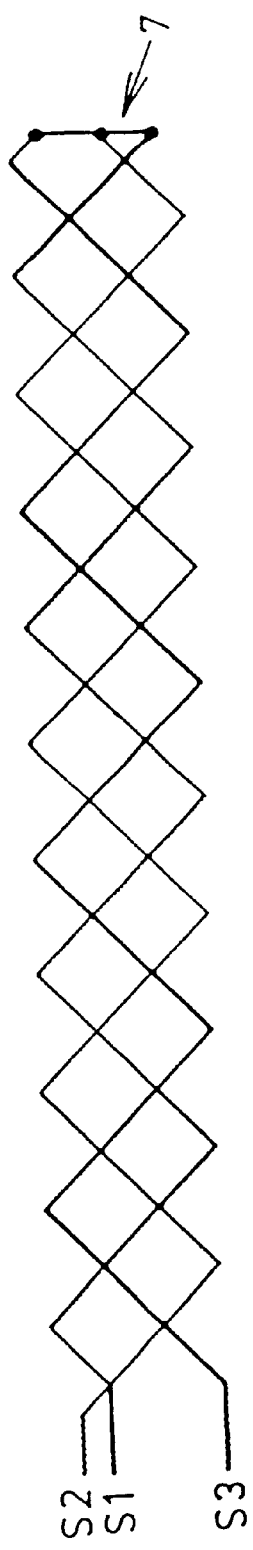
FIG. 5a
FIG. 5b

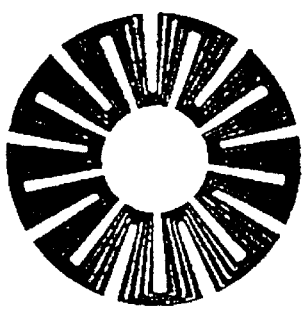
FIG. 6a FIG. 6b FIG. 6c
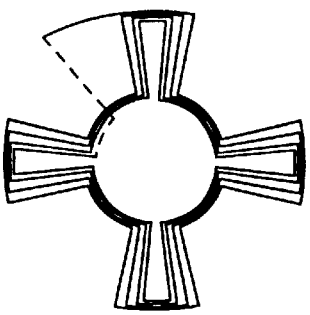
FIG. 6d FIG. 6e FIG. 6f
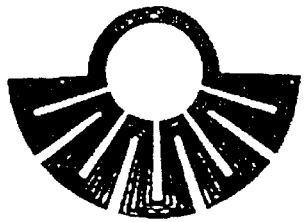
FIG. 6g
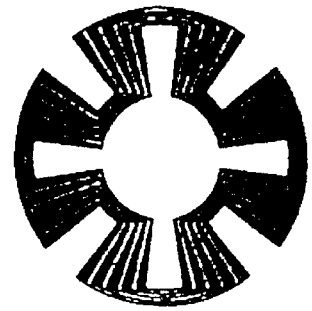
FIG. 6h FIG. 6k
FIG. 6i

INDUCTIVE ANGLE SENSOR

BACKGROUND OF THE INVENTION

This invention relates to an inductive angle sensor with a stator element, having an exciting coil with a periodic AC voltage applied thereto and several receiving coils, and with a rotor element that affects a strength of inductive coupling between the exciting coil and receiving coils as a function of its angular position relative to the stator element, and an evaluation circuit for determining the angular position of the rotor element relative to the stator element from voltage signals induced in the receiving coils.

An embodiment of a position sensor shown in FIG. 3 of European patent application (0 159 191 A2) discloses such an angle sensor. A structural principle of this position, or angle, sensor is that secondary coils formed as angularly-periodic, interspaced, series-connected coil sequences are provided, with each coil sequence being formed of one or more pairs of coils connected in reversed polarity. Because of this reversed polarity connection, an output signal coupled in from primary coils to a coil sequence of secondary coils is respectively (approximately) zero.

A movable element, the position of which is to be determined relative to this coil arrangement, has a "flow coupler" that is structured to be small in contrast to dimensions of a measuring path and modifies coupling between the primary coil(s) and individual secondary coils. A coil sequence of secondary coils that contains a secondary coil influenced in this manner generates an output signal that is different from zero. Each of the coil sequences of secondary coils is connected with part of a phase shifting network so that, at an output of this network, an output signal dependent on the position of the movable element is phase shifted relative to the signal fed into the primary coil (s). An evaluation of a time difference between the signal fed into the primary coils and the output signal of the phase shifting network is used for determining a respective position of the movable element. In European patent document (EPA 0 159 191 A2), a magnetic element that is small relative to the measuring path or even a conducting ring (page 4, paragraph 2) is suggested as a flow coupler; the ring is characterized as disadvantageous since it produces only a weak output signal.

Use of a phase shifting network, whose tolerances significantly reduce a measuring accuracy of the sensor, is disadvantageous in this angle sensor. The zero output signal expected from the coil sequences of uninfluenced secondary coils is hardly achievable, at least not without additional costly balancing measures.

Therefore, it is an object of this invention to provide an angle sensor according to the introductory paragraph above whose structure is uncomplicated and inexpensive and which achieves a high degree of measuring accuracy without expensive balancing measures. Specifically, an inductive angle sensor according to this invention should be as insensitive to manufacturing and mounting tolerances as possible, as well as to environmental influences, particularly outside temperature.

SUMMARY

According to principles of this invention a rotor element of an inductive angle sensor of the introductory paragraph above forms at least one closed-loop lead that, at least over a partial area, forms a periodic repeating bend structure.

BRIEF DESCRIPTION OF THE DRAWINGS

The invention is described and explained in more detail below using embodiments shown in the drawings. The described and drawn features can be used in other embodiments of the invention individually or in preferred combinations. The foregoing and other objects, features and advantages of the invention will be apparent from the following more particular description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

FIGS. 5a and 5b are respectively schematic wiring diagrams illustrating arrangements and connections of receiving coils.

FIGS. 6a–6i and 6k are respectively schematic wiring diagrams of various embodiments of bend structures forming closed-loop leads on rotor elements of this invention.

DESCRIPTION OF PREFERRED EMBODIMENT

Figure 2:
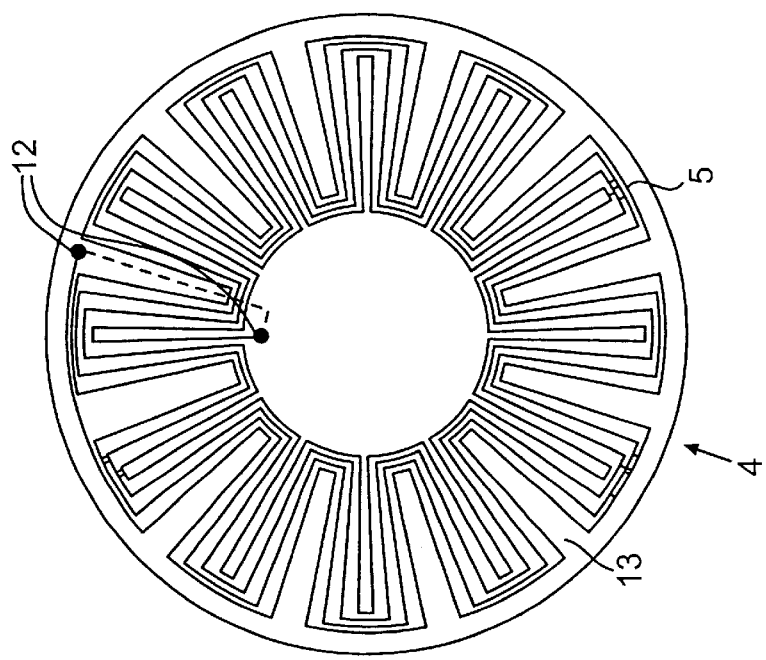
FIGS. 1 and 2 are block and schematic wiring diagrams of an embodiment of a stator element and a rotor element of an inductive angle sensor of this invention with FIG. 1 showing a cutaway portion of a rotor on the stator of FIG. 1.
Figure 1:
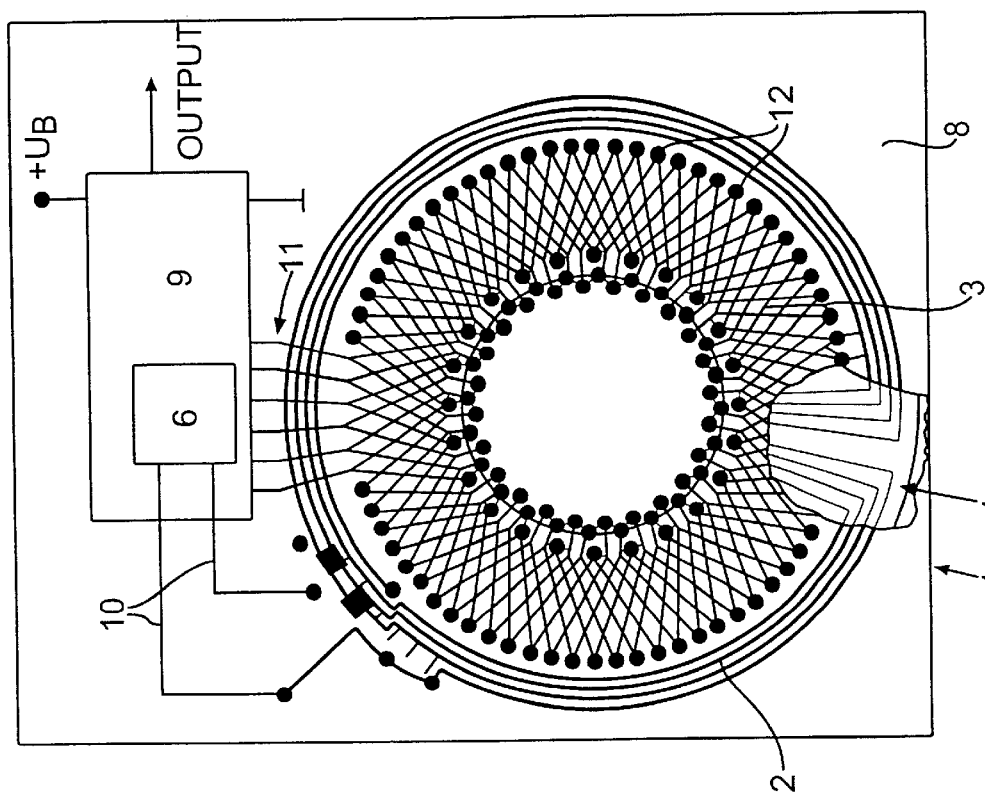
Figure 3:
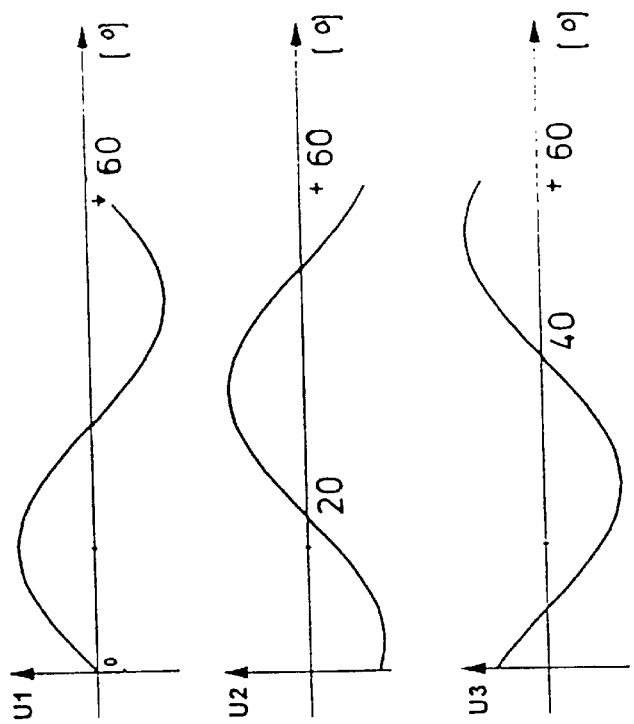
FIG. 3 is a schematic wiring diagram representing functional principles of an inductive angle sensor of this invention.

First, using FIGS. 1, 2 and 3, structural and functional principles of inductive angle sensors of this invention are explained.

An exciting coil 2 includes one or more strip-conductor coils on a printed circuit board (not shown). This strip conductor is electrically connected to a condenser C so that, together with inductance of the strip conductor, an LC oscillating circuit 6 results. This LC oscillating circuit 6 contains an active circuit that controls the LC circuit so that sinusoidal voltage and current waves are created in the exciting coil 2.

The current that flows through the exciting coil 2 generates a magnetic alternating field in receiving coils 3 that are located in an area of the magnetic alternating field. Induced voltages occur through magnetic induction at connections S1, S2, S3 of the receiving coils 3, which are sent to an evaluation circuit (not shown).

A system of the receiving coils 3 of the angle sensor includes three individual receiving coils 3a, 3b, 3c that are offset a specific angle from one another and are positioned preferably on several layers of the multilayer printed circuit board. Since each receiving coil 3a, 3b, 3c, in a direction about a circumference of the stator element 1 (see FIG. 1), has 6 turns, or bends, formed by a meandering, or bend, structure, a symmetrical coil arrangement is achieved whereby turns, or bends, of adjacent coils are offset 20° from one another.

A rotor element of the angle sensor is not shown in FIG. 3. This rotor is located a small distance from the stator element 1, which it does not touch, and is arranged to rotate about a common axis of symmetry relative to it. The rotor has at least one closed-loop lead that, at least across partial areas, forms a periodically repeating bend structure, such as with horseshoe-like bends, about a circumference, or peripheral area, of the rotor element.

In a simplest case, the rotor element (not shown) includes two or more conductive segments. In the magnetic alternating field of the exciting coil 2, eddy currents occur in the rotor segments through magnetic induction, which weaken the excitation field. Because of the geometrical shape of the segments, the eddy currents are forced along specific paths, which leads to the magnetic field being modified at particular portions of the circumference. This uneven field change leads to induced voltages in the receiving coils 3 being dependent on a relative angle of the rotor element relative to the receiving coils 3. The induction voltages measured at the receiving coils 3, therefore, change with the position of the rotor element to the receiving coils 3. A voltage curve about the rotation angle is substantially sinusoidal.

Since the receiving coils 3 are of several strip conductors 3a, 3b, 3c, spaced by a specific angle, several voltages are available for evaluation, the signal amplitudes of which are phase-shifted relative to each other across the angle. These voltages are compared with each other in an evaluation circuit for generating angle information. In this manner, a generated angular position is independent of absolute, induced voltages and thus independent of various production tolerances. Also, coupled-in interferences are substantially suppressed by establishing such relationships.

For further explanation, assume that a closed-loop lead, or wire, of a not-shown rotor element has the same bend structure, or at least a bend structure having the same angular periodicity as one of the receiving coils 3. Additionally, at a given point in time, let the bend structure of the rotor element stand exactly parallel to the bend structure of the boldly-illustrated receiving coil 3a and let it then be rotated beyond this position by 60°.

Figure 4:
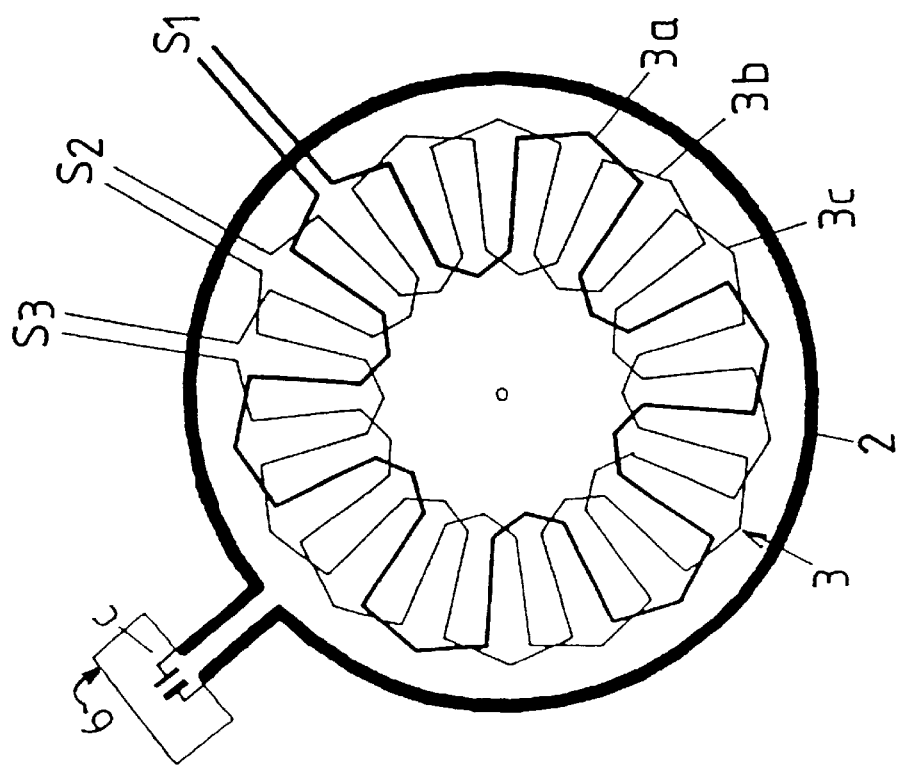
FIG. 4 is a diagram of voltage curves of receiving coils of the inductive angle sensor illustrated in FIG. 3.

Voltage curves U1, U2, U3 resulting at the coil connections S1, S2, S3 are shown in FIG. 4. In an initial position, the bends of the rotor element stand parallel to those of the receiving coil 3a. Since the bends represent a closed-loop lead, the field is therefore weakened considerably, and the voltage U1 induced in the receiving coil 3a is minimal. Since the receiving coils 3b, 3c are covered only partially by the bends of the rotor element, voltages U2, U3 of moderate dimensions occurs in them, respectively, the polarity signs of which depend on directions in which the parts of the receiving coil covered by the closed-loop lead are extending.

After the rotor element is shifted 20°, it then precisely covers the bend of the receiving coil 3b, whereby the voltage U2 is now minimal at its connections S2; after shifting by 40°, the voltage U3 at the coil connections S3 of the receiving coil 3c accordingly passes through zero.

After 60°, the bends of the rotor element that form the closed-loop lead are once again parallel to the receiving coil 3a, whereby the initial condition is restored.

Thus the output signals of the receiving coils 3 change in an approximately sinusoidal manner across a rotation angle, specifically corresponding to the angular periodicity of the individual receiving coils 3. Angles greater than the 60° example referenced here can easily be measured by counting the periodic repetitions of the output signals.

An arrangement and connections of receiving coils that represents a significant improvement relative to circuit expense is described below with reference to FIGS. 5a and 5b.

In FIG. 5a, the structure of the three receiving coils 3a, 3b, 3c with their connections S1, S2, S3 (from FIG. 3) is converted to a linear form. It is clear that a density of strip conductors for forming the three receiving coils is relatively high in this instance.

The same information content from the signals of the three receiving coils can also be achieved with an arrangement of strip conductors as in FIG. 5b. The density of strip conductors here is only half that of FIG. 5a, which is achieved in that, for each receiving coil "a return wire" is "spared" and a connection of each receiving coil is respectively made to a common summation point, or wire, 7.

This summation point 7 is approximately comparable to a star point of a multi-phase generator. A potential of the summation point is, in an ideal case, zero and therefore is not sent, or is indeed sent, to the evaluation circuit for correcting an influence of any interference.

Each "actual" receiving coil now results from selecting two of the "out-going wires", i.e. the receiving coil output signals now occur between the connections S1 and S2 or S2 and S3 or S3 and S1, with the curves of these signals corresponding qualitatively to the curves shown in FIG. 4.

A particular advantage of this embodiment in comparison to that in FIG. 5a is that, for the same density of strip conductors, twice as many receiving coils can be put on a printed circuit board, whereby a resolution of the inductive angle sensor of the invention can be accordingly doubled.

A diagram of a structure for technically carrying out the inductive angle sensor is presented in FIGS. 1 and 2.

FIG. 1 shows the stator element 1. An exciting coil 2, receiving coils 3, and an evaluation circuit 9 are placed on a multilayer printed circuit board 8. The circuit of the evaluation circuit 9 also contains an oscillator for the exciting coil 2, structured as an LC oscillating circuit 6, with inductance therefor being provided by the exciting coil 2.

In addition to connections 10, 11 for connecting to the exciting coil 2 and the receiving coils 3, the evaluation circuit 9 also has power supply connections (+UB, ground) as well as a measurement signal output (output), which is sent to a connector plug (not shown), for example.

The arrangement of the exciting coil 2 and the receiving coils 3 is generally circular, with a circumferential area of the exciting coil 2 being formed from several concentrically positioned strip conductor turns. Of the receiving coils 3, which are made of strip conductors placed on various layers of the printed circuit board, each forms a periodically repeating-bend structure (e.g. triangular, horseshoe or meandering shapes) about its circumference. The angular periodicity of each of these bend structures is 30°.

One connection of each of these six strip conductor loops is connected to the evaluation circuit 9, while the other connections are connected electrically to each other on the printed circuit board 8 by a summation point, or wire (not shown).

The evaluation circuit 9 rectifies the AC voltages induced in the receiving coils 3, amplifies them, and compares the output voltages of each two receiving coils with each other (proportionate detection) for determining position.

This seemingly intricate arrangement of receiving coils 3 can be shown in FIG. 1 only by projecting all the receiving coils arranged on the various layers of the printed circuit board 8 onto a common drawing plane. Each of the point-shaped ends of the strip conductors defines a feedthrough 12 between the individual layers of the printed circuit board 8.

In FIG. 2, one possible strip conductor structure of a rotor element 4 of this invention is presented. A closed-loop lead 5 in the form of a bend structure repeating periodically in a direction of a circumference, or about a peripheral area, is placed on a circular substrate 13 such as a printed circuit board.

The angular periodicity of these bend structures is 30° which is exactly the same size as that of the angular periodicity of the individual receiving coil structures. This coincidence is not necessary, but it is advantageous for making signal detection as simple as possible.

The entire closed-loop lead 5 is shown here by a single strip conductor that, in addition to having the characteristic meandering shape, interleaves into itself many times in a spiral form. The start and end points of the closed-loop lead 5 are connected electrically to each other by two feedthroughs 12, e.g. on the back of the printed circuit board. To this end, a similarly structured closed-loop lead can be provided on the back of the printed circuit board, as well.

As shown in FIGS. 6a–6i and 6k, the bend structure of the closed-loop lead illustrated in FIG. 2 can vary according to application.

The embodiments of FIGS. 6a–6i and 6k of the closed-loop lead of the rotor element can differ, e.g. in diameter (compare 6a–6f with 6g–6i and 6k), which is adjusted particularly to a size of a given stator element.

Another characteristic difference is in angular periodicity of bends of the bend structure; the illustrations show:

90° sensors (6g, 6i);
60° sensors (6a–6f);
a 40° sensor (6h), and
a 36° sensor (6k) with a meandering structure that extends only over a partial area of the circumference, suitable, for example, for angle sensors having limited measuring ranges.

If one compares the bend structure of rotor elements 6h and 6i, 6h has a considerably more complex structure, but therefore provides a correspondingly higher angular resolution.

In addition, interleaved (6a, 6b, 6g–6i and 6k) and non-interleaved (6c–6f) conductor bends can be distinguished.

Interleaved conductor bends can be realized by applying a conductive material to an insulating substrate, e.g. strip conductors on printed circuit boards. By contrast, in non-interleaved bend structures the conductive loop itself can form the rotor element, with the rotor element being structured as an inexpensive metal stamped part, for example.

The more complex interleaved conductive bends (6g–6i and 6k) interact more strongly with the primary field, and thus generate a clearer sensor output signal.

A distinction can also be made in the type of interleaving:

Concentrically interleaved conductive bends are shown in embodiments (6a, 6h–6i and 6k), while embodiments (6b and 6g) show a spiral form of interleaving, as does the example of the embodiment in FIG. 2.

In an inductive angle sensor according to this invention, therefore, the rotor element that affects coupling between the exciting coil and the receiving coil has a particular, periodic geometrical structure, so that a change in angle of the rotor element relative to the stator element leads to a change in the coupling between the exciting coil and the receiving coils, and thus, in turn, directly to a detectable periodic signal.

The rotor element forms a closed-loop lead, or has a short-circuited wire, that, at least along partial areas of the rotor element, forms the periodic bend structure in the circumferential direction. This periodic bend structure, the specific structure of which can vary in details, is structured, for example, mainly in a meandering shape and is similar to (or even the same as) the geometric structure of the receiving coil(s).

Since a change in angle of the rotor element changes the coupling of all receiving coils relative to the exciting coil, advantageously the output voltages of several receiving coils can be used for position detection. Through compensatory, or, more advantageously, proportionate, detection of several coil voltages, manufacturing tolerances of the inductive angle sensor, or even errors owing to improper adjustment of parts of the sensor arrangement relative to each other, or even larger interference influences, can be well compensated.

Advantageously, for example, the rotor element can be structured as a printed circuit board(s) printed with a strip conductor. Since, aside from the closed-loop lead, no additional components must be mounted on the rotor element, the rotor element can advantageously be a flat structure, and can be mounted an especially small distance from the stator element.

A particularly simple and inexpensive mode of the rotor element is as a simple metal stamped part.

Depending on an application, however, a base material of the rotor element can also be a plastic or a hybrid material, whereby the periodic bend structure can be realized by a metal coating or also by a conductive paste.

It is also advantageous to place a bend structure forming a closed-loop lead on each of opposite sides of the rotor element, whereby it is advantageous for strengthening the sensor output signals if both bend structures are of the same design and are located parallel to each other. Another possibility for generating as clear a sensor signal as possible is to make the bend structure of the closed-loop lead in the form of several concentric or spiral turns interleaved into each other.

It is also advantageous for the receiving coils to form periodic bend structures on the stator element, just as the closed-loop lead does on the rotor element. A contour of a conductive loop is determined in that it can be described clearly in a system of polar coordinates and in that a gradient of such a curve described in the system of polar coordinates df (r, $\phi$)/d$\phi$ is alternately positive and negative, whereby a part of the curve with a negative gradient is symmetrical to a part of the curve with a positive gradient (e.g. Triangular) and in that, at reversing points, a part with a zero gradient (e.g. structured as a meander or trapezoid).

With regard to a particularly simple detection, it is advantageous (but in no way necessary) if the receiving coils and the closed-loop lead have the same angle-dependent periodicity.

It is particularly advantageous to provide an odd number of receiving coils, with at least three of them. Thus, during a detection that takes the output signals of several receiving coils into account, the output signals of individual coils can be electrically inverted and each used in an evaluation; whereas, with an even number of receiving coils, an inverted coil output signal of one receiving coil produces exactly the output signal of another receiving coil. The information content of the output signals is thus significantly increased when the number of receiving coils is odd.

It is also particularly advantageous to connect one connection of each receiving coil to a summation wire, in a manner comparable to a star connection of a multi-phase generator having a star point. Since the return wires of the individual receiving coils thus do not have to be run back along the board, the number of receiving coils can thus be doubled while the density of strip conductors remains unchanged, whereby the resolution of the angle sensor can be increased correspondingly.

The exciting coil can be structured particularly simply as a strip conductor concentrically extended along a circumference, or peripheral area, of the stator element. In order to achieve a small sensor diameter, it can also be placed "behind" the receiving coils, i.e. in a plane parallel to the receiving coils.

The excitation circuit can be structured in a particularly advantageous manner as an LC oscillating circuit, utilizing the exciting coil as the inductance. Thus, in comparison to a quartz oscillator, at least the cost of an oscillator crystal can be saved. In addition, an LC oscillating circuit—as a so-called "flexible", or "soft", oscillating circuit—reacts more flexibly with less sensitively to influences of external electromagnetic interference.

It is particularly advantageous for offsetting production or installation-related tolerances if the evaluation circuit proportionately compares the lead voltages of the receiving coils. By establishing ratios, mechanical inaccuracies relating to distance or parallel placement of exciting coil and receiving coils are largely offset, for example. To this end, the evaluation circuit, can particularly advantageously select receiving coils to be evaluated, depending on an angular range for example, so that in each instance a greatest possible accuracy is achieved.

The evaluation circuit 9 can include an Application Specific Integrated Circuit (ASIC).

The invention claimed is:

1. An inductive angle sensor comprising:
   a stator element having an exciting coil for having a periodic AC voltage applied thereto and several receiving coils,
   a rotor element that is rotatable relative to the exciting and receiving coils of the stator element that affects a strength of inductive coupling between the exciting coil and receiving coils as a function of the rotor element's angular position relative to the stator element,
   an evaluation circuit for receiving signals induced in the receiving coils for determining an angular position of the rotor element relative to the stator element from the signals induced in the receiving coils, wherein
   the rotor element forms at least one closed-loop lead that, at least over a partial area, has a repeating periodic bend structure in a direction of a periphery of the rotor element.

2. An inductive angle sensor as in claim 1, wherein the rotor element is structured as a stamped part made of a conductive material.

3. An inductive angle sensor as in claim 1, wherein the rotor element includes a non-conductive material onto which the closed-loop lead of a conductive material is applied.

4. An inductive angle sensor as in claim 3, wherein the rotor element is made of metal-coated plastic.

5. An inductive angle sensor as in claim 3, wherein the rotor element is made of a hybrid substrate material and the closed-loop lead 5 is applied as a conductive paste.

6. An inductive angle sensor as in claim 3, wherein the rotor element comprises a printed circuit board with a strip conductor printed thereon.

7. An inductive angle sensor as in claim 6, wherein the printed circuit board forming the rotor element has a bend structure forming a closed-loop lead on each side.

8. An inductive angle sensor as in claim 1, wherein at least one of the receiving coils forms a receiving-coil periodic bend structure along at least a partial area of the periphery of the stator element.

9. An inductive angle sensor as in claim 1, wherein the bend structure comprises several turns interleaved with each other in at least one of a concentrical form or a spiral form.

10. An inductive angle sensor as in claim 8, wherein the receiving-coil bend structure and the bend structure of the closed-loop lead have the same angle-dependent periodicity.

11. An inductive angle sensor as in claim 1, wherein the stator element has an odd number of, but at least three, receiving coils.

12. An inductive angle sensor as in claim 1, wherein one connection of each receiving coil is connected to a common summation point.

13. An inductive angle sensor as in claim 1, wherein the exciting coil forms a concentrically structured strip conductor about the stator element.

14. An inductive angle sensor as in claim 1, wherein is further included an excitation circuit for producing the periodic AC voltage said excitation circuit being structured as an LC oscillating circuit.

15. An inductive angle sensor as in claim 1, wherein the evaluation circuit proportionately compares receiver-coil voltages.

16. An inductive angle sensor as in claim 1, wherein the receiver coils are connected with condensers to form resonant circuits.

17. An inductive angle sensor as in claim 1, wherein the evaluation circuit comprises an ASIC.

\* \* \* \* \*